United States Patent [19]

Auger

[11] 4,272,106

[45] Jun. 9, 1981

[54] COPY SHEET

[75] Inventor: Bertrand Y. Auger, St. Paul, Minn.

[73] Assignee: Minnesota Mining and Manufacturing Company, St. Paul, Minn.

[21] Appl. No.: 83,385

[22] Filed: Oct. 10, 1979

[51] Int. Cl.[3] .......................... B41L 1/20; B32B 27/20; B41M 5/16; B41M 5/18

[52] U.S. Cl. .................................. 282/27.5; 434/102; 46/1 R; 46/226; 427/145; 427/150; 427/161; 427/162; 427/163; 427/164; 427/261; 427/337; 428/199; 428/203; 428/205; 428/207; 428/480; 428/483; 428/913; 428/914; 430/12; 430/517; 430/618; 430/620

[58] Field of Search ............... 282/27.5; 427/150, 145, 427/337, 161, 162, 164, 163; 430/618, 396, 620, 517, 12; 428/199, 203, 205, 207, 480, 483; 35/9 G, 26, DIG. 3; 46/1 R, 226

[56] References Cited

U.S. PATENT DOCUMENTS

| | | | |
|---|---|---|---|
| 3,617,325 | 11/1971 | Spokes et al. | 427/145 |
| 4,054,718 | 10/1977 | Garner et al. | 427/150 X |
| 4,139,965 | 2/1979 | Curry et al. | 46/1 R |

FOREIGN PATENT DOCUMENTS

| | | |
|---|---|---|
| 940301 | 1/1974 | Canada . |
| 2751122 | 5/1978 | Fed. Rep. of Germany . |

*Primary Examiner*—Thomas J. Herbert, Jr.
*Attorney, Agent, or Firm*—Cruzan Alexander; Donald M. Sell; Warren R. Bovee

[57] ABSTRACT

Copy sheet comprising substantially transparent dye layer which can undergo color shift in response to color developer composition. Preferred dye comprises pH sensitive dye and preferred color developer comprises weak acid.

10 Claims, No Drawings

COPY SHEET

This invention relates to copy sheets and more particularly, to a transparent copy sheet which can be imaged by conventional copying machines and highlighted and supplemented by the application of a color developing composition.

Various materials for the recording and presentation of graphic information are well known. Substrates, including transparent films, which can be imaged by xerographic and thermographic copying machines are known and have become widely used. When transparent substrates are used for visual presentations by various means, such as by projection on an overhead projector, black images, such as in the form of a graph or table of data, are generally first applied by a copying machine and then additional images added during presentation by use by colored marking pens, to supplement or highlight the initial black-line images.

For some applications a more dramatic supplementation or highlight technique is desired. A transparent film having increased contrast can be used as an overlay sheet. By laying such a sheet on top of the black-line imaged transparent copy sheet, and selectively imaging the overlying sheet, supplemental and highlight images can be projected along with the initial black-line images on the copy sheet.

German Offenlegungsschrift No. 2751122, laid open May 24, 1978, describes a transparent substrate containing a coating of a pH-sensitive indicator dye which can be imaged with a citric acid solution. Such materials are useful with overhead projectors. The imageable films are prepared by coating a transparent plastic film, generally cellulose acetate, with a gelatin coating containing a pH-sensitive indicator dye such as a dye of the sulphophthalein series. The color of such dyes in an alkaline medium is blue-green to blue-violet. The dyes change to a bright yellow in an acid medium. Thus, when a blue colored plastic sheet is marked with a felt tip pen containing an acidic solution, such as citric acid, having a pH range between about 3 and 5, a bright yellow mark is formed on the transparent substrate.

The imageable overlay films which have previously been known have gained limited use due to the inconvenience and cost of employing two separate sheets when making visual presentation. Moreover, the requirement of using two separate films results in somewhat decreased light transmission due to thickness of the films, surface reflection losses and the like.

The present invention overcomes the disadvantages of the known imageable films by providing a single transparent copy film which can be imaged by conventional xerographic of thermographic copying techniques and further supplemented or highlighted by additional imaging means, for example, at the time of presentation on an overhead projector. More particularly, the additional imaging means comprises means for providing a mark which can have a lower optical density, i.e. lighter than the film on which it is made. Such a dark to light shift allows the formation of "negative" images having higher contrast and greater visual impact than "positive" colored marks which have a higher optical density than the clear, transparent copy sheet on which they are made.

The copy films of the present invention generally comprise a substantially transparent carrier sheet having on one major surface a substantially transparent layer containing a dye (or dye precursor) capable of undergoing a color shift when contacted with a composition which will induce the color shift (sometimes referred to herein as a "color developer"). The present films also include means to provide for the formation of black-line images by conventional xerographic or thermographic copying techniques.

In a preferred embodiment of the invention the dye layer comprises a pH-sensitive dye, such as bromcresol green, in an organic binder coated on the obverse surface of the carrier sheet. The black-line imaging means comprises means for the formation of black line images on the surface of the copy sheet. In one embodiment the sheet is coated with a visibly, heat-sensitive layer on the reverse surface of the carrier to provide a thermographic imaging sheet. In another embodiment, the dye layer itself is receptive to toner powder and functions as black line imaging surface in a xerographic copier.

The preferred copy sheet can be imaged or highlighted by the use of an acidic marking fluid, such as citric acid, to provide a bright, yellow, transparent mark on a blue sheet. Such a negative imaging system can be used with dramatic effect in presentations on projection means such as an overhead projector.

The preferred copy sheets prepared as described above have a dark blue background color. When the sheets are imaged by xerographic or thermographic copiers, black images are provided on the blue background. These blue colored transparent sheets can be readily projected on an overhead projector and the black image is readily visible against the blue background. Striking visual high-lights of the black copy can be provided by contacting appropriate areas of the obverse surface of the sheet with an acidic solution, such as citric acid, to shift the background color from blue to yellow in the areas so contacted. The yellow areas stand out from the remaining blue background, thus, high-lighting the copy. In addition, the black image against the yellow background has a higher contrast than the black image against the blue background.

As discussed above, the copy sheet of the present invention comprises a substantially transparent carrier or supporting film. The preferred supporting layer or carrier is a dimensionally stable, substantially transparent, polymeric film stable enough to be handled and used in copying machines without undesirable wrinkling or shrinking. Generally a thickness of about 1.5 to 10 mils is satisfactory. A polyester film is satisfactory although other polymeric substrates which can be xerographically imaged, which are shrink resistant when heated, which are dimensionally stable and do not adversely react with the coatings to be applied, can also be used.

The carrier is coated on its obverse surface with a layer comprising a dye which can udergo a characteristic color shift when contacted with a shift inducing composition (sometimes referred to herein as a color developer). In a preferred embodiment, the supporting film is coated with a pH-sensitive dye which shifts to or develops a characteristic color in response to a composition of the appropriate pH. The dye is dissolved and held in a substantially transparent organic binder. A number of pH sensitive dyes are known which will work well in the present invention. Such dyes are described in U.S. Pat. Nos. 4,139,965, 3,617,325, 3,454,344 and German OLS No. 2,751,122. A partial list includes bromcresol purple, bromcresol green, direct yellow 4, alizarin yellow R, congo red, etc.

In one embodiment, bromcresol green is used to provide a dark blue transparent coating. A background transmission density of about 0.8 to about 0.9 has been found desirable to produce a striking visual effect. This can be achieved by applying about 0.03 grams of the dye per square foot of surface area (0.33 g/m$^2$). More dye gives greater density and more vivid blue/yellow imaging, but with less blue/black contrast when imaged with a conventional xerographic or thermographic copying machine.

The dye is carried in a matrix which is stable and substantially transparent. A gelatin such as a photographic gelatin can be employed as s binder. A ratio of about 1 to 4 parts gelatin per part of dye can be used with satisfactory results. A 3 to 1 ratio is preferred. As the ratio of gelatin to dye increases, the coated copy sheet tends to transfer dye to the fingers of a handler while as the ratio increases, higher wet coating weights are required to obtain the necessary dye concentration and transmission density. Bacteriostats and wetting agents may be included to respectively prevent degradation of the gelatin and to aid in obtaining a uniform coating.

A base is added to the dye layer composition to adjust the pH of the layer to provide the desired color. A 10% sodium hydroxide solution can advantageously be used to adjust the pH. The preferred pH range for bromcresol green dye is between about 6.5 to 8.5. A pH under 6.5 imparts a green cast to the coated sheet while a pH over 10 inhibits hardening of the coated dye/gelatin layer resulting in rub-off of the coating in use.

A hardener is generally added to cause crosslinking of the gelatin used in the dye layer, a technique commonly used in the manufacture of photographic film. A preferred hardener is formaldehyde. Sufficient hardener should be added to cause the coating to resist finger-printing and rub-off during use. A concentration of at least about 2% by weight of the gelatin solids has been found to be desirable with about 3% being a most preferred amount. Concentrations greater than 3%, e.g. up to about 4%, have been used with good results.

In a preferred embodiment, the polymeric carrier is primed on the surface so that the dye layer will adhere well to the carrier. A preferred priming technique involves the application of a base primer comprising polyvinylidene chloride conventionally used in the production of photographic films. Over this layer is applied a clear, photographic gelating sublayer to act as an intermediate between the base primer and the dye layer.

By proper choice of the supporting substrate, the coated sheet can be rendered suitable for imaging by various copying techniques thereby providing a copy sheet having dual copying and highlight imaging characteristics. A dimensionally and heat stable polyester carrier can be imaged by known xerographic (plain paper) copiers. This material, when sufficiently thick, is sufficiently heat resistant to withstand fusion of the toner powder without wrinkling and the like.

When the copy sheet of the present invention is to be used in a conventional xerographic copying machine it has been found desirable to add a friction reducing component to the dye layer to facilitate movement of the copy sheets against one another in the feed mechanism of the copy machine. A particulate silicon dioxide material, average particle size 2 to 3 microns, can be added to reduce the friction between sheets to allow smooth feeding of the sheets into a copying machine. The particulate additive also has the effect of reducing surface reflection and fingerpainting. Amounts up to about 9% by weight based on the dye and gelatin solids in the dye layer are effective. About 1% is the preferred amount with higher amounts causing an increase in haziness of the film, but providing improved resistance to fingerprinting.

Thermographic imaging capability can be imparted to the film by coating the film on the reverse surface (the dye layer being on the obverse surface) with a visibly heat sensitive layer comprising a water insoluble noble metal salt and an appropriate organic reducing agent. Localized heating of the sheet as in a thermographic copying machine causes a visible change to occur in the heat-sensitive layer. This technology has been described in U.S. Pat. Nos. 2,910,377, 3,031,329 and 3,080,254. Ferric soaps in combination with silver soaps can also be used to provide a wide latitude heat sensitive layer as described in U.S. Pat. Nos. 3,682,684 and 3,795,532.

The silver and ferric soaps of long chain fatty acids, e.g. as described in U.S. Pat. Nos. 2,910,377 and 2,663,654 are suitable for use of in the copying sheets of the present invention. The preferred soaps are silver behenate and ferric behenate. The silver soap, along with the ferric soap if desired, are mixed with a polymeric, film-forming binder and coated as a single layer on the supporting film. When both the silver and ferric soaps are employed a combination of 10 to 80 parts silver soap and 90 to 20 parts ferric soap are preferred. Other useful noble metal salts are exemplified by silver stearate, gold stearate, and silver salts of oleic, lauric, hydroxystearic, acetic, phthalic, terephthalic, butyric, m-nitrobenzoic, salicylic phenylacetic, pyromellitic, p-phenylbenzoic, undecylenic, camphoric, furoic, acetamidobenzoic and o-aminobenzoic acids. Mercuric behenate is also useful, although the image formed with such material generally provides less contrast than do those produced with silver salt compositions.

As coreactants or reducing agents for the noble metal and ferric soaps there may be employed materials which are cyclic, preferably aromatic, organic compounds having an active hydrogen atom attached to an oxygen, nitrogen or carbon atom which is directly attached to an atom of the cyclic ring, the compound being a reducing agent for the metal ion of the heat-sensitive composition. Separate coreactants for the silver soap and ferric soap may be employed, but it has been found possible to use the same coreactant for both of the metal soap reactants. Polyhydric phenols such as pyrogallic acid, catechol, protocatechuic acid, azelaoyl pyrogallic acid, azelaoyl bispyrogallic acid, methyl gallate, butyryl pyrogallol and behenoyl pyrogallol are particularly effective as coreactants for both the silver and ferric soaps. Mixtures of these and other coreactants for the metal soaps may also be used, e.g., to obtain images of preferred shades of color.

Toners such as phthalazinone are known to improve the silver image in copy sheets based on silver soaps and are found desirable in the products of this invention, e.g. in amounts of about 10–20 percent of the weight of the metal soaps. Polymeric film-forming binders, nonfusing at the temperatures employed in copying, will ordinarily be included in amounts sufficient to form a smooth well-bonded coating. The compositions may be applied to paper or other nontransparent backings and when thus employed may contain pigments, fillers and other additives. Particularly desirable results are obtained using clear transparent coatings on transparent film backings, the resulting copies then serving admirably as projection transparencies for use on overhead projectors.

A topcoat is preferably applied over the thermographic layer to reduce fingerprinting and improve stability at high temperature and humidity. Such a topcoat comprises a film-forming binder in a volatile solvent. Cellulose acetate butyrate is a preferred topcoat material.

The thermographic layer can be applied as a solvent coating at a wet coating weight of about 0.3 to about 0.5 g/ft$^2$ (3.3 to 5.4 g/m$^2$) while the topcoat may be applied at a wet coating weight of about 0.05 to 0.15 g/ft$^2$ (0.5 to 1.6 g/m$^2$).

Other thermographic imaging systems may also be employed such as are described in U.S. Pat. Nos. 3,856,552.

The copy sheets of the present invention can be imaged by conventional copying techniques and, separately, by shifting the color of the dye layer by localized application of a shift inducing composition. When a pH-sensitive dye is employed, this is conveniently achieved by the localized application of an acidic material, preferably pH about 3 to 5, from a mechanical or hand operated applicator such as a felt tipped marking pen, a swab, thermographic donor sheet or the like. The addition of the acidic material causes the dye to shift color on the sheet. For example, bromcresol green which provides a blue sheet in a basic medium shifts to a contrasting bright, transparent yellow on the application of an acidic solution. Weak, non-corrosive, nontoxic acids, such as citric acid are preferred for this use.

Other dye materials can be incorporated into an acid solution to provide a color other than the color provided by the dye layer. For example, an orange-red color can be provided by incorporating various amounts of a red dye into an acid solution. The combination of the shift of color of the dye layer to yellow due to the acid and the presence of the additional red dye provides an orange color at low concentrations of the red dye and a red color at higher concentrations of the red dye. Use of a green dye in the acid solution provides a green color.

The shifted dye layer can also be made to revert to its original color by application of a basic solution to the acidic dye layer. A solution of ammonium bicarbonate in water can act as a satisfactory "eraser" composition and can readily be applied with a conventional marking tool.

A surfactant is generally added to the imaging fluids to improve wettability and resulting image speed and intensity.

The practice of the present invention can be further illustrated by reference to the following representative examples wherein all parts are by weight unless otherwise indicated.

EXAMPLE 1

A xerographically imageable, pH sensitive film was prepared by solvent coating a transparent 4 mil polyester film with a polyvinylidene chloride base primer and a clear photographic gelatin sub-layer. Over this primed film was applied a pH sensitive transparent dye layer. The dye layer was applied by coating the film with the following composition:

| | Pts/Wt |
|---|---|
| Photographic gelatin, 10% solids in deionized (DI) water | 38.053 |
| Bacteriostat solution | 0.038 |
| Bromcresol green dye, water soluble salt, 10% solids in DI water | 12.684 |
| Deionized (DI) water | 44.635 |
| Wetting agent, acetyl-betane, 10% in DI water | 0.477 |
| Silicon dioxide particles (2-3 microns) | 0.051 |
| NaOH, 10% solution, (to pH 8.5) | 0.629 |
| Formaldehyde, 3.7% solution in DI water | 3.090 |

The above components were mixed and coated with an extrusion bar coater at a coating weight of about 0.07 to 0.17 g/ft$^2$ (0.8 to 1.8 g/m$^2$). When dried, the film had a transparent blue color and an optical density of between about 0.8 and 0.9 units using a MacBeth Transmission densitometer on gold filter.

An acid solution was prepared having the following formula:

| | Pts/Wt |
|---|---|
| Citric acid | 20.0 |
| DI water | 80.0 |
| Wetting agent (Triton X-100, Dow Corning) | 0.1 |

The solution was put into a flat tipped marking pen and when applied to the blue film described above, turned the film a bright, transparent yellow in the areas of application.

A basic erasing solution comprising 5 parts ammonium bicarbonate, 95 parts DI water and 0.1 parts wetting agent could reverse the color change when applied causing the yellow areas to return to the blue color.

The film described above could be imaged by a conventional xerographic copier, providing satisfactory black images on the blue film and without wrinkling or shrinking. The black imaged film could be placed on the stage of an overhead projector to provide a clear, black on blue projected image. Application of the acid solution to selected areas caused these areas to turn bright, transparent yellow, providing a dramatic high-lighting affect.

EXAMPLE 2

A thermographically imageable film was prepared by applying an imaging layer to the reverse side of a blue film prepared as in Example 1 (but without the silicon dioxide particles). The thermographic imaging layer was formed by coating the following compositions onto the film at a wet coating weight of about 0.4 to 0.5 g/ft$^2$ (4.3 to 5.4 g/m$^2$).

| | Pts/Wt |
|---|---|
| Silver behenate | 3.4 |
| Polyvinyl acetate resin | 7.66 |
| Phthalazinone | 0.50 |
| Benzotriazole | 0.07 |
| Tetrachloro-phthalic anhydride | 0.20 |
| Methyl gallate | 1.00 |
| Methyl ethyl ketone | 3.34 |
| Acetone | 83.90 |

Following application and drying of the reactive layer a topcoat comprising 5 parts cellulose acetate butyrate in 10 parts ethyl alcohol and 85 parts acetone was applied as a topcoat over the reactive layer at a wet coating weight of about 0.5 to 0.15 g/ft$^2$ (5.4 to 1.6 g/m$^2$) and dried.

The film could be readily imaged on a thermographic copying machine to provide dark, black images on the blue sheet. The black-imaged film could be projected on an overhead projector and bright, transparent yellow marks applied by using the citric acid solutions as described in Example 1.

EXAMPLE 3

Marking compositions which provided an orange, red and green color, respectively, when used with the films described in Examples 1 and 2 were prepared by dissolving selected dyes in an acid solution comprising 80 parts DI water, 20 parts citric acid and 0.1 part wetting agent (Triton X-100). When added to the above composition, 4 parts Sandocryl Brilliant Red B4G dye provided an orange image, 20 parts of the same dye provided a red image and 17 parts Sandoz Malachite Green powder dye provided a green image.

What is claimed is:

1. A copy sheet comprising (a) a substantially transparent, heat resistant, polymeric carrier film having means for providing black-line images when used with a master sheet under imaging conditions, and (b) a substantially transparent, colored dye layer covering at least a portion of one major surface of said carrier film, said dye layer containing at least one dye capable of undergoing a color shift to become lighter in response to the application of a color developer composition.

2. A copy sheet according to claim 1 wherein said means for providing black-line images comprises a substantially transparent, heat-sensitive imaging layer coated on the side of the carrier film opposite said dye layer.

3. A copy sheet according to claim 1 wherein said means for providing black-line images comprises a toner-powder receptive dye layer.

4. A copy sheet according to claim 1 wherein said dye is a pH sensitive dye.

5. A copy sheet according to claim 4 wherein said dye is bromcresol green.

6. A copy sheet comprising (a) a substantially transparent, heat-resistant, polyester film having on at least a portion of the obverse surface thereof a multilayer coating comprising a first primer layer comprising polyvinylidene chloride adjacent said polyester film, a second gelatin layer and a third, colored dye layer comprising a pH sensitive dye in a hardened gelatin binder, said pH sensitive dye capable of undergoing a color shift to become lighter in response to the application of a color developer composition, and (b) covering at least a portion of the reverse surface of said polyester film, a visibly heat sensitive thermographic imaging layer comprising a silver soap and a reducing agent therefor.

7. A copy sheet comprising a substantially transparent, heat-resistant, polyester film having on at least a portion of the obverse surface thereof a multilayer coating comprising a first primer layer comprising polyvinylidene chloride adjacent said polyester film, a second gelatin layer and a third, colored dye layer comprising a pH sensitive dye and a particulate silicon dioxide friction reducing agent in a hardened, gelatin binder, said pH sensitive dye capable of undergoing a color shift to become lighter in response to the application of a color developer composition.

8. An imaging system comprising the copy sheet of claim 1 and a color developer composition in a transfer means.

9. An imaging system according to claim 8 wherein said dye is a pH sensitive dye and said color developer composition is an acidic solution.

10. A method of making highlighted projection transparencies comprising (a) forming black-line images corresponding to a master sheet on the copy sheet of claim 1, and (b) shifting the color of at least certain portions of said copy sheet to become lighter by application of a color developer composition to the dye layer carried thereon.

* * * * *

UNITED STATES PATENT AND TRADEMARK OFFICE

CERTIFICATE OF CORRECTION

PATENT NO. : 4,272,106

DATED : June 9, 1981

INVENTOR(S) : Bertrand Y. Auger

It is certified that error appears in the above-identified patent and that said Letters Patent are hereby corrected as shown below:

Column 1, line 19: second "by" should be -- of --.

Column 2, line 55: "udergo" should be -- undergo --.

Column 3, line 13: "s" should be an -- a --.

Column 3, line 16: "increases" should be -- decreases --.

Column 4, line 1: "fingerpainting" should be -- fingerprinting --.

Column 5, line 16: "Nos." should be -- No. --.

Column 6, line 30: "flat" should be -- felt --.

Signed and Sealed this

*Twenty-seventh* Day of *October 1981*

[SEAL]

*Attest:*

GERALD J. MOSSINGHOFF

*Attesting Officer* *Commissioner of Patents and Trademarks*